US006716033B1

(12) United States Patent
Lassowsky

(10) Patent No.: US 6,716,033 B1
(45) Date of Patent: Apr. 6, 2004

(54) SYSTEM FOR TEACHING MATHEMATICS

(75) Inventor: Oksana Lassowsky, Riva, MD (US)

(73) Assignee: KidSpark, LLC, Severna, MD (US)

( * ) Notice: Subject to any disclaimer, the term of this patent is extended or adjusted under 35 U.S.C. 154(b) by 401 days.

(21) Appl. No.: 09/706,061

(22) Filed: Nov. 3, 2000

(51) Int. Cl.[7] .......................... G09B 19/00; G09B 19/02
(52) U.S. Cl. ........................ 434/205; 434/191; 434/199; 434/209
(58) Field of Search .................... 434/188, 191, 434/198, 199, 205, 209

(56) References Cited

U.S. PATENT DOCUMENTS

| | | | | | |
|---|---|---|---|---|---|
| 367,223 | A | * | 7/1887 | Moody | 283/44 |
| 533,216 | A | * | 1/1895 | Troelltsch | 235/89 R |
| 1,161,381 | A | * | 11/1915 | Duffy | 235/67 |
| 1,246,152 | A | * | 11/1917 | Perrine | 273/296 |
| 1,396,379 | A | * | 11/1921 | Moore | 434/167 |
| 2,198,670 | A | * | 4/1940 | Johnson | 273/299 |
| 2,336,742 | A | * | 12/1943 | Maguire | 235/74 |
| D163,085 | S | * | 5/1951 | Bishop | 434/205 |
| 3,061,947 | A | * | 11/1962 | Faudree | 434/205 |
| 3,374,559 | A | * | 3/1968 | Smith | 434/209 |
| 3,469,325 | A | * | 9/1969 | Greenberg | 273/156 |
| 3,491,193 | A | * | 1/1970 | Bianchi | 434/199 |
| 3,504,449 | A | * | 4/1970 | Kobler | 434/205 |
| 3,571,950 | A | * | 3/1971 | Walker | 434/197 |
| 3,743,750 | A | * | 7/1973 | Hurue | 434/191 |
| 3,789,517 | A | * | 2/1974 | Romstad | 434/199 |
| 3,874,096 | A | * | 4/1975 | Romstad | 434/199 |
| 4,553,944 | A | * | 11/1985 | Flanagan | 434/191 |
| 4,714,429 | A | * | 12/1987 | Phillips | 434/198 |
| 5,040,987 | A | * | 8/1991 | Frazier | 434/188 |
| 5,529,497 | A | * | 6/1996 | Bigold | 434/191 |
| 5,782,628 | A | * | 7/1998 | Alioto | 434/200 |
| 5,868,393 | A | * | 2/1999 | Williams | 273/299 |
| 6,056,553 | A | * | 5/2000 | Huang | 273/292 |
| 6,109,924 | A | * | 8/2000 | Sanford et al. | 273/299 |

* cited by examiner

*Primary Examiner*—Teresa Walberg
*Assistant Examiner*—Julie Brochetti
(74) *Attorney, Agent, or Firm*—Foley & Lardner

(57) ABSTRACT

A system uses objects that can be combined to learn mathematical operations. Operand objects illustrate a numerical operand and an associated set of possible numerical solutions to operations performed on the operand number. Operator objects illustrate an operation symbol and a numerical operator. When an operator object and an operand object are combined, a mathematical operation consisting of the operand, the operation symbol and the operator is illustrated, and a solution to the operation is illustrated. The operand objects also include a non-numerical representation of the value of the operand, and the operator objects also include a non-numerical representation of the value of the operator. When combined, the representation of the value of the operator, and the representation of the value of the operand cooperate to represent the value of the solution to the mathematical operation.

12 Claims, 4 Drawing Sheets

SYSTEM FOR TEACHING MATHEMATICS

FIELD OF THE INVENTION

The invention relates to teaching mathematics and the solution of mathematical operations, particularly to children.

BACKGROUND OF THE INVENTION

Various games are used to assist children in the learning of mathematics. In one conventional type of math game, an operation of two numbers is printed on a first card, and the child is asked to select from pile of number cards the number that is the correct answer to the operation.

Other types of mathematics games employ electronics to produce the answer to an operation entered by the child. However, this type of game does not require the child to perform the calculation herself, and does not provide any alternative representation of the quantities involved in the calculation.

SUMMARY OF THE INVENTION

The invention provides objects that can be used by a child to learn mathematical operations. The invention provides a first set of objects, each illustrating an operand number and an associated set of possible solutions to operations performed on the operand number. The invention further provides a second set of objects, each illustrating an operation symbol and an operator number. The operation symbol may indicate addition, subtraction, multiplication or division. When an object from the first set is combined with an object from the second set, the combined objects illustrate a mathematical operation consisting of the operand, the operation symbol and the operator. The combined objects further illustrate a solution to the operation. The solution is a number selected from the set of possible solutions illustrated on the operand object.

The operand object may also include a representation of the value of the operand, and the operator object may also include a representation of the value of the operator. When combined, the representation of the value of the operator object and the operand object the representation of the value of the operand and the representation of the value of the operator cooperate to represent the value of the solution to the mathematical operation.

The invention allows a child to choose two numbers, physically combine them into a form representing a mathematical operation, and verify or learn the solution to the operation, without the use of any electronics. By providing a range of operators that can be combined with an operand, the invention allows a child to experiment with numbers, for example, by comparing the results of combining different operators with a chosen operand. The objects and the manner in which they are combined are easy for a child to understand, and allow the child to combine the objects with her own hands and have complete control over the process of exploration.

DETAILED DESCRIPTION OF PREFERRED EMBODIMENTS

The preferred embodiments of the invention described below utilize printed cards as objects that illustrate operands and solutions, and operators and operations, respectively. However, a variety of alternative objects may be employed.

Figure 1:
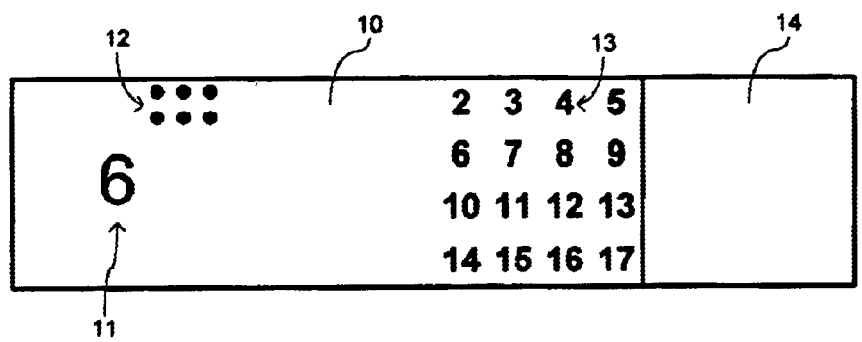
FIG. 1 illustrates an operand card for addition or subtraction in accordance with a preferred embodiment of the invention.

FIG. 1 illustrates an operand card 10 in accordance with a preferred embodiment of the invention used for illustration of addition and subtraction operations. The card includes a numerical operand 11 and a group of markings 12 that are equal in number to the value of the operand 11 and provide a non-numerical representation of the value of the operand. Spaced apart from the operand is a matrix of numerical solutions 13. A flap 14 is disposed next to the matrix.

Figure 2:
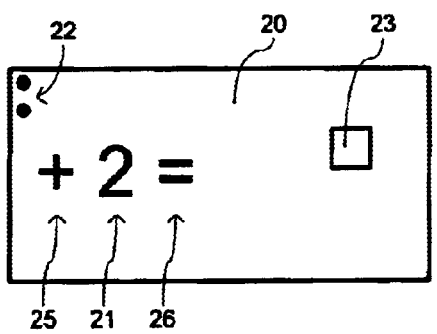
FIG. 2 illustrates an operator card for addition in accordance with a preferred embodiment of the invention.

FIG. 2 illustrates an operator card 20 that may be used with the operand card of FIG. 1 to illustrate addition in accordance with a preferred embodiment of the invention. The card includes a numerical operator 21 and a group of markings 22 that are equal in number to the value of the operator 21 and provide a non-numerical representation of the value of the operator. The card further includes an operation symbol 25, in this case, an addition sign. An equal sign 26 is located adjacent the operator 21. Spaced apart from the operator is an aperture 23.

Figure 3:
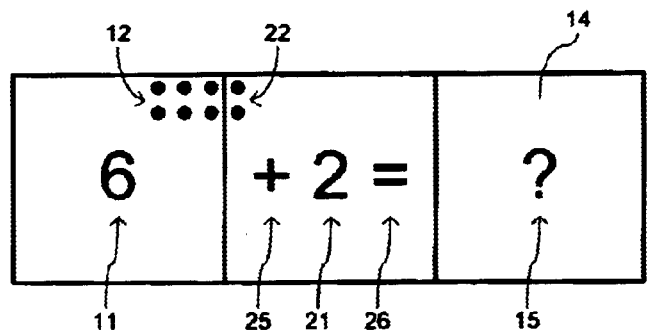
FIG. 3 illustrates a combination of the operand card of FIG. 1 and the operator card of FIG. 2 in a state where a solution to the operation illustrated by the combination of the cards is hidden.

FIG. 3 illustrates the combination of the operand card of FIG. 1 and the operator card of FIG. 2. The operand 11 of the operand card, and the operation symbol 25 and operator 21 of the operator card form the operation "6+2=." The solution of the operation is hidden under the flap 14 of the operand card. The flap 14 has a question mark printed on it to indicate that the child using the cards must solve the operation. The markings 12, 22 of the cards are aligned adjacent to each other to form a single group of markings that are equal in number to the solution of the operation and provide a non-numerical representation of the value of the solution of the operation.

Figure 4:
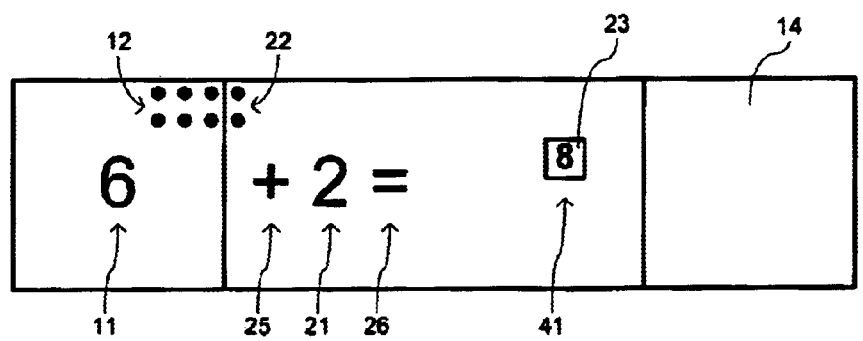
FIG. 4 illustrates a combination of the operand card of FIG. 1 and the operator card of FIG. 2 in a state where a solution to the operation illustrated by the combination of the cards is revealed.

FIG. 4 illustrates the combination of the operand card of FIG. 1 and the operator card of FIG. 2 with the flap 14 of the operand card lifted away from the surface of the operator card. When the flap is lifted, the entire equation formed by the combination of the cards including the solution is revealed as "6+2=8." The aperture 23 of the operator card is formed in a location that coincides with the solution to the operation within the matrix of solutions 13 of the operand card, such that the solution to the operation is visible, and all other numbers in the matrix remain hidden.

Figure 5:
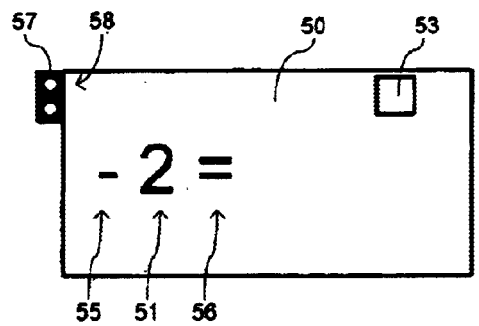
FIG. 5 illustrates an operator card for subtraction in accordance with a preferred embodiment of the invention.

While the operator card of FIG. 2 performs addition, in another preferred embodiment of the invention, operator cards are employed in combination with the operand card of FIG. 1 to illustrate subtraction. FIG. 5 illustrates an operator card 50 for illustrating subtraction. This operator card is similar to the operator card of FIG. 2, in that it includes a numerical operator 51, an aperture 53, an operation sign 55 (which in this case is a "minus" sign), and an equal sign 56. Unlike the operator card of FIG. 2, however, the subtraction operator card of FIG. 5 has a tab 57 having apertures 58 therein. The apertures of the tab are equal in number to the value of the operator and provide a non-numerical representation of the value of the operator. The apertures are the same shape as the markings found on the operand card of FIG. 1, and the tab is the same color as the markings.

Figure 6:
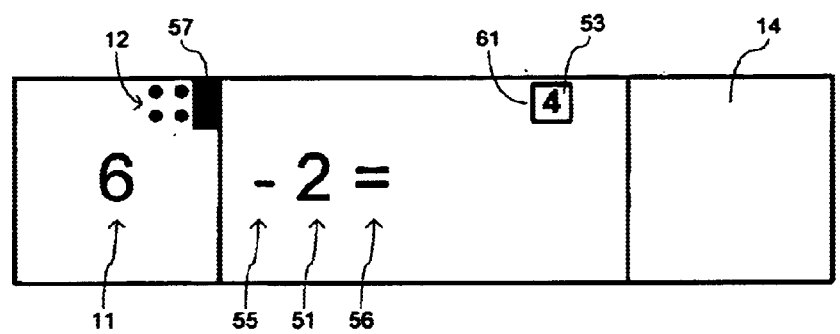
FIG. 6 illustrates a combination of the operand card of FIG. 1 and the operator card of FIG. 5 in a state where a solution to the operation illustrated by the combination of the cards is revealed.

FIG. 6 illustrates the combination of the operand card of FIG. 1 and the operator card of FIG. 5 with the flap 14 of the operand card lifted away from the surface of the operator card. When the flap is lifted, the solution to the operation formed by the combination of the cards is revealed, such that the combined cards illustrate the equation "6-2=4." The aperture 53 of the operator card is formed in a location that coincides with the solution to the operation within the matrix of solutions 1 3 of the operand card, such that the solution to the operation is visible, and all other numbers in the matrix remain hidden. The tab 57 of the operator card is aligned with the markings 12 of the operand card, and the apertures are aligned with corresponding markings of the operand card. Because the tab and the markings are the same color, the markings on the operand card create the appearance of filling in the corresponding apertures of the tab. In effect, the tab removes a number of markings equal to the value of the operator from the original group of markings, and the remaining markings provide a non-numerical representation of the value of the solution of the operation.

Other operator and operand cards may be similarly provided so that any numeral may be employed as either operator or operand. Referring again to FIGS. 1 and 2, it can be seen that if, for example, the operator printed on the operator card was 3 rather than 2, the position of the aperture in the operator card would be located to coincide with that of the numeral 9 within the matrix of solutions. Similarly, if the value of the operator printed on the operator card of FIG. 5 was 3 rather than 2, the position of the aperture in the operator card would be located to coincide with that of the numeral 3 within the matrix of solutions.

On the other hand, if the value on the operand card was 5 rather than 6, the values of the numerals at each position within the matrix of the operand card would be reduced by one so that the value revealed by the aperture in the operator card would be 7. Similarly, if the value on the operand card was 9 rather than 6, the values of the numerals at each position within the matrix of the operand card would be increased by three so that the value revealed by the aperture in the operator card would be 11.

Accordingly, the design of operator and operand cards for addition and subtraction in accordance with the preferred embodiment of the invention requires that a convention for the positions of solution values and operand card apertures is adhered to for all operand and operator cards. Where solutions are arranged in a matrix, the size and position of the matrix on each operand card must be the same, and for every operand card, the specific operand printed on the card must be located in the same position within the matrix. Accordingly, through proper placement of the aperture on each operator card, the operator card will reveal the proper solution to each operation irrespective of whether the operation is addition or subtraction, and irrespective of the value on the operand card.

While the cards of the preferred embodiments of FIGS. 1–4 and 5–6 employ a 5×3 solution matrix, the matrix may be made larger to accommodate a larger range of operators and operands. The solution matrix may also include negative numbers so that a given operator can be subtracted from a smaller operand. Where negative solutions are generated, apertures in the tab of the operator card align with all marks of the operand card, in the manner described above. Remaining apertures of the tab for which there are no corresponding marks reveal the background surface of the operand card, effectively leaving a number of markings equal in number to the negative value of the solution and having a color different from that of the markings representing the original operand value. Thus the apertures in the tab present a non-numerical representation of the value of the solution and its sign. These features enable the child to develop a conception that differentiates between positive and negative values.

Further preferred embodiments of the invention are employed to illustrate multiplication and division operations.

Figure 7:
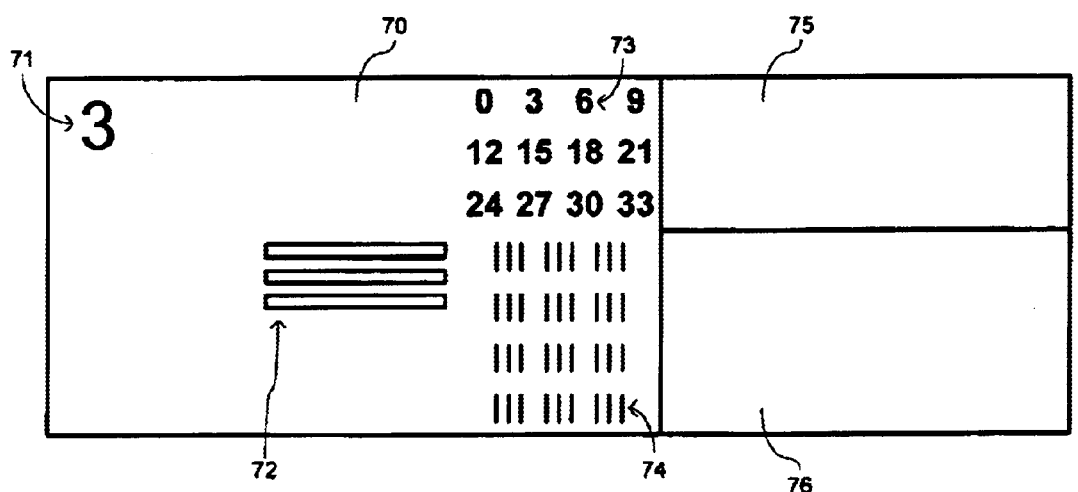
FIG. 7 illustrates an operand card for multiplication in accordance with a preferred embodiment of the invention.

FIG. 7 illustrates an operand card 70 for illustrating a multiplication operation. The card includes a numerical operand 71 and a group of elongated apertures 72 that are equal in number to the value of the operand 71 and provide a non-numerical representation of the value of the operand. In view of the further description below it will be appreciated that alternative non-numerical representations such as stripes may also be employed. Spaced apart from the operand is a matrix of numerical solutions 73. Below the matrix of solutions is a second matrix of groups 74 of markings. Each group contains markings equal in number to the value of the operand and provide a non-numerical representation of the value of the operand. Independently moveable flaps 75 and 76 are provided next to the matrix of solutions and the matrix of groups.

Figure 8:
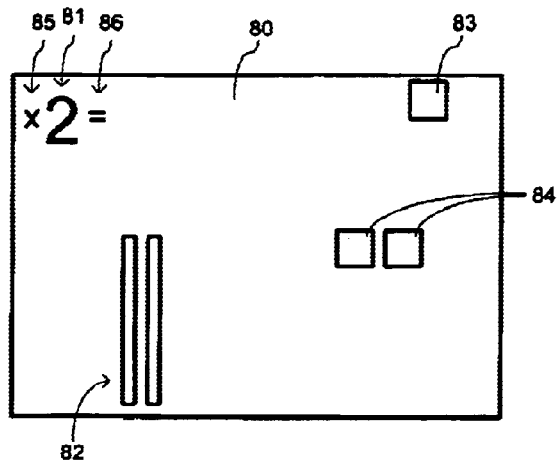
FIG. 8 illustrates an operator card for multiplication in accordance with a preferred embodiment of the invention.

FIG. 8 illustrates an operator card 80 that may be used with the operand card of FIG. 7 to illustrate multiplication in accordance with a preferred embodiment of the invention. The operator card includes a numerical operator 81 and a group of elongated apertures 82 that are equal in number to the value of the operator 81. The elongated apertures extend in a direction perpendicular to those of the operand card 70, as will be illustrated further below, and provide a non-numerical representation of the value of the operator. The operator card further includes an operation symbol 85, in this case, a multiplication sign. An equal sign 86 is located adjacent the operator 81. Spaced apart from the operator is an aperture 83. The aperture 83 is located in an area corresponding to the solution matrix 73 of the operand card 70. Further apertures 84, equal in number to the value of the operator, are provided in an area corresponding to the marking groups matrix 84 of the operand card and provide a non-numerical representation of the value of the operator.

Figure 9:
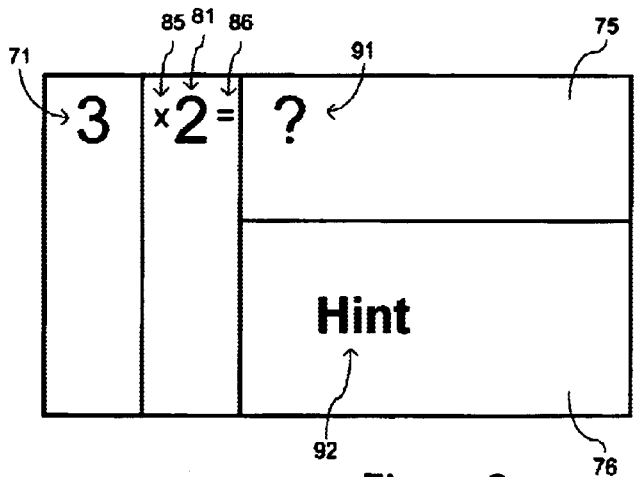
FIG. 9 illustrates a combination of the operand card of FIG. 7 and the operator card of FIG. 8 in a state where a solution to the operation illustrated by the combination of the cards is hidden.

FIG. 9 illustrates the combination of the operand card of FIG. 7 and the operator card of FIG. 8. The operand 71 of the operand card, and the operation symbol 85 and operator 81 of the operator card form the operation "3×2=." The solution of the operation is hidden under the flap 75 of the operand card. The flap 75 has a question mark 91 printed on it to indicate that the child using the cards must solve the operation. The second flap 76 has the word "HINT" 92 printed thereon to indicate that a hint to assist in solving the operation is located under the flap.

Figure 10:
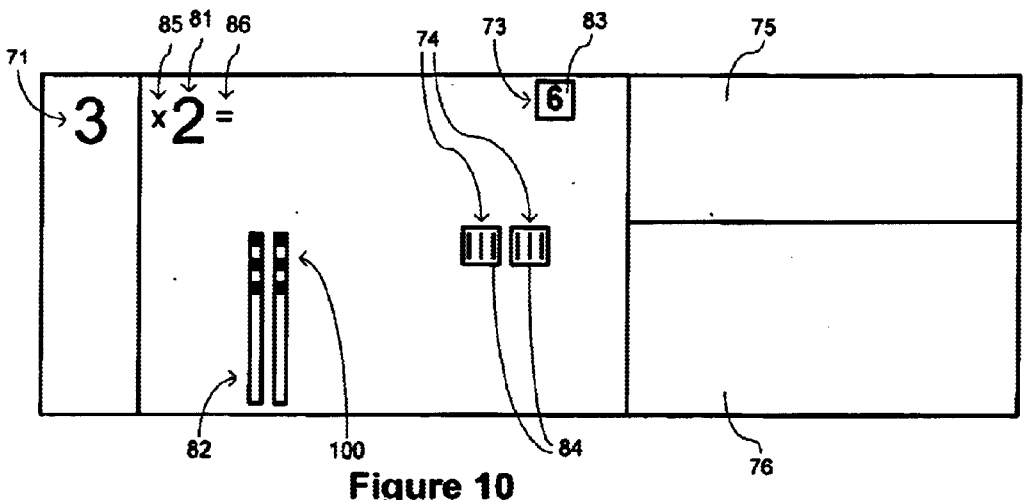
FIG. 10 illustrates a combination of the operand card of FIG. 7 and the operator card of FIG. 8 in a state where a solution to the operation illustrated by the combination of the cards is revealed.

FIG. 10 illustrates the combination of the operand card of FIG. 7 and the operator card of FIG. 8 with the flaps 75 and 76 of the operand card lifted away from the surface of the operator card. When the upper flap 75 is lifted, the entire equation formed by the combination of the cards including the solution is revealed as "3×2=6." The aperture 83 of the operator card is formed in a location that coincides with the solution to the operation within the matrix of solutions 73 of the operand card, such that the solution to the operation is visible, and all other numbers in the matrix remain hidden. When the lower flap 76 is lifted, two groups of markings 74 printed on the operand card are exposed within the apertures 84 of the operator card. The exposure of the marking groups in this manner provides a non-numerical representation of the operation, namely, two groups of three markings are exposed, giving the child a visual reference for understanding the quantity "three times two". Further, when the lower flap 76 is lifted, a matrix of open spaces is formed by the intersection of the elongated apertures 72 of the operand card and 82 of the operator card. In FIG. 10, the three apertures of the operand card and the two apertures of the operator card intersect to form six open spaces that provide a non-numerical representation of the value of the solution to the operation. Further, since the open spaces are arranged such that they can be perceived both as three groups of two spaces (when examined from top to bottom), and as two groups of three spaces (when examined from left to right), they serve as both an illustration of the solution to the operation, and an illustration of the interchangeability of the operator and the operand in the multiplication operation.

Other operator and operand cards may be similarly provided so that any numeral may be employed as either operator or operand. Referring again to FIGS. 7 and 8, it can be seen that if, for example, the operator printed on the operator card was 3 rather than 2, the position of the aperture in the operator card would be located to coincide with that of the numeral 9 within the matrix of solutions. On the other hand, if the value on the operand card was 5 rather than 3, the values of the numerals at each position within the matrix of the operand card would be multiples of 5, and the value revealed by the aperture in the operator card would be 10.

Accordingly, the design of operator and operand cards for multiplication in accordance with the preferred embodiment of the invention requires that a convention for the positions of solution values and operand card apertures is adhered to for all operand and operator cards. Where solutions are arranged in a matrix, the size and position of the matrix on each operand card will be the same, and for every operand card, the matrix will begin with multiplication of the operand by zero, then by one, then by two, and so on. Accordingly, through proper placement of the aperture on each operator card, the operator card will reveal the proper solution to each operation, irrespective of the value on the operand card. While the cards of the preferred embodiments of FIGS. 7–10 employ a 3×4 solution matrix, the matrix may be made larger to accommodate a larger range of operators and operands.

Figure 11:
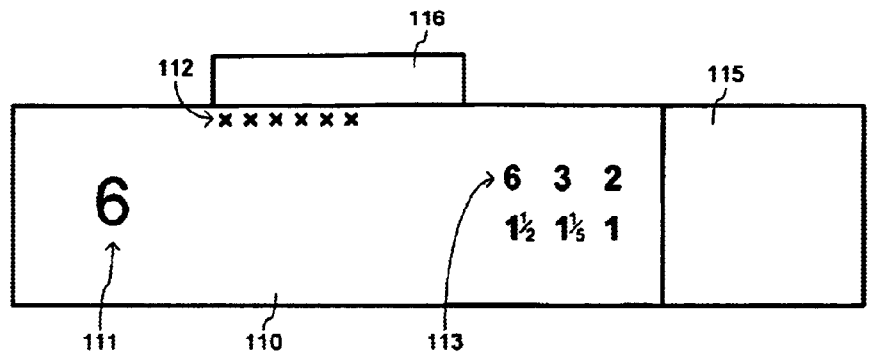
FIG. 11 illustrates an operand card for division in accordance with a preferred embodiment of the invention.

FIG. 11 illustrates an operand card 110 for illustrating a division operation. The card includes a numerical operand 111 and an upper group of markings 112 that are equal in number to the value of the operand 111 and provide a non-numerical representation of the value of the operand. Spaced apart from the operand is a matrix of solutions 113. A moveable flap 115 is provided next to the matrix of solutions 113, and an additional moveable flap 116 is provided at the upper edge of the card.

Figure 12:
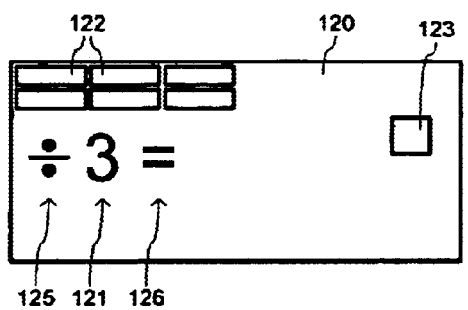
FIG. 12 illustrates an operator card for division in accordance with a preferred embodiment of the invention.

FIG. 12 illustrates an operator card 120 that may be used with the operand card of FIG. 11 to illustrate division in accordance with a preferred embodiment of the invention. The operator card includes a numerical operator 121 and an operation symbol 125, in this case, a division sign. An equal sign 126 is located adjacent the operator 121. Spaced apart from the operator is an aperture 123. Above the operator is a group of apertures 122. The group of apertures 122 is located in an area corresponding to the group of markings 112 of the operand card 110, and the apertures are sized to contain a number of markings equal to the value of the operand, as will be illustrated further below.

Figure 13:
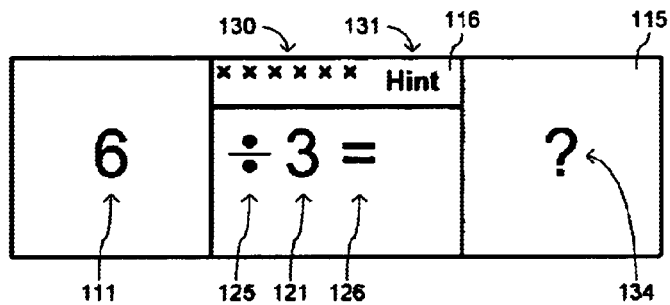
FIG. 13 illustrates a combination of the operand card of FIG. 11 and the operator card of FIG. 12 in a state where a solution to the operation illustrated by the combination of the cards is hidden.

FIG. 13 illustrates the combination of the operand card of FIG. 11 and the operator card of FIG. 12. The operand 111 of the operand card, and the operation symbol 125 and operator 121 of the operator card form the operation "6÷3=." The solution of the operation is hidden under the flap 115 of the operand card. The flap 115 has a question mark 134 printed on it to indicate that the child using the cards must solve the operation. The upper flap 116 has the word "HINT" 131 printed thereon to indicate that a hint to assist in solving the operation is located under the flap, and also has printed thereon a group of markings 130 equal in number to the value of the operand.

Figure 14:
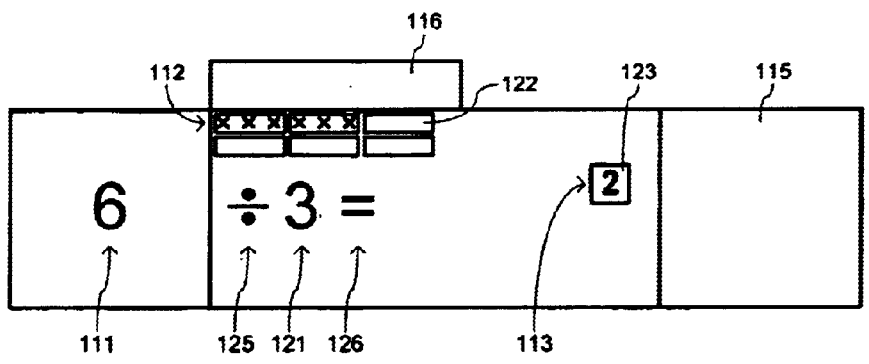
FIG. 14 illustrates a combination of the operand card of FIG. 11 and the operator card of FIG. 12 in a state where a solution to the operation illustrated by the combination of the cards is revealed.

FIG. 14 illustrates the combination of the operand card of FIG. 11 and the operator card of FIG. 12 with the flaps 115 and 116 of the operand card lifted away from the surface of the operator card. When the flap 115 is lifted, the entire equation formed by the combination of the cards including the solution is revealed as "6÷3=2." The aperture 113 of the operator card is formed in a location that coincides with the solution to the operation within the matrix of solutions 123 of the operand card, such that the solution to the operation is visible, and all other solutions in the matrix remain hidden. When the upper flap 116 is lifted, the markings 112 of the operand card are exposed and grouped as two groups of three markings. Thus the child using the cards is provided with a non-numerical illustration of how the operand is divided into the operator.

Other operator and operand cards may be similarly provided so that any numeral may be employed as either operator or operand. Referring again to FIGS. 11 and 12, it can be seen that if, for example, the operator printed on the operator card was "2" rather than "3", the position of the aperture in the operator card would be located to coincide with that of the numeral "3" within the matrix of solutions. On the other hand, if the value on the operand card was "8" rather than "6", the values at each position within the matrix of the operand card would be solutions to divisions of the new operand by one ("8"), by two ("4"), by three ("2⅔"), and so on. In relation to this example, it will be appreciated that the apertures 122 of the operand card serve to illustrate the concept of remainders and fractional quantities. For example, when the operator card of FIG. 12 bearing the operator "3" is combined with the operand card bearing the operand "8", two apertures of the operator card will contain three markings, and a third aperture will contain only two markings. Thus the markings in the third aperture provide a non-numerical illustration of a remainder of two, and of the fractional quantity "⅔".

Accordingly, the design of operator and operand cards for division in accordance with the preferred embodiment of the invention requires that a convention for the positions of solution values and operand card apertures is adhered to for all operand and operator cards. Where solutions are arranged in a matrix, the size and position of the matrix on each operand card will be the same, and for every operand card, the solutions of the matrix will be arranged beginning with the division of the operand by one, then by two, by three, and so on. Accordingly, through proper placement of the aperture on each operator card, the operator card will reveal the proper solution to each operation irrespective of the value on the operand card.

While the cards of the preferred embodiments of FIGS. 11–14 employ a 2×3 solution matrix, the matrix may be made larger to accommodate a larger range of operators and operands.

While the preferred embodiments described above represent particular ways of practicing the invention, the preferred embodiments may be modified in a variety of manners that do not depart from the scope of the invention. For example, while cards are used as the objects bearing the various illustrations that form the operation and its solution, a variety of other objects and materials could be similarly employed, irrespective of their material composition or shape. For purposes of the invention, it is necessary only that the operand and operator objects are cooperable such that, when they are combined in a predetermined manner, a solution to a mathematical operation comprising the operand value, operation symbol and operator value is indicated. Similarly, while it is preferred the objects further provide a non-numerical representation of the values of the operand and operator, and of the solution to the operation, the manners employed in the preferred embodiment for expressing these quantities are simply representative, and alternative manners of expression, location and deployment may be implemented in accordance with the invention.

It is also noted that the disclosed embodiments vary with respect to whether the non-numerical representations of the operand and operator are exposed or concealable, such as with a flap. However, either option may be employed in any of the embodiments within the scope of the invention.

It is further noted that while the preferred embodiments provided different sets of cards for addition/subtraction, multiplication, and division, a common set of operand cards could be used to combine addition/subtraction with multiplication and/or division. Such combination is enabled by appropriate selection and location of the solutions illustrated on the operand card, and location of corresponding apertures on the operator cards.

Accordingly, while the embodiments described here represent the implementations of the invention presently preferred by the inventor, a variety of alternatives may be employed without departing from the scope of the invention as defined by the claims appended hereto.

What is claimed is:

1. A system for illustrating an addition operation, comprising:

an operand card illustrating a numerical operand value, a plurality of numerical solutions to a mathematical operation performable on the operand, and a group of marks equal in number to the value of the operand; and an operator card illustrating a numerical operator value, addition symbol, and a group of marks equal in number to the value of the operator, wherein the operand card and the operator card are cooperable such that when combined in a predetermined manner, a solution to an addition operation comprising the operand value, and the operator value is indicated from among the plurality of solutions illustrated on the operand card, and the group of marks of the operand card and the group of marks of the operator card combine to form a group of marks equal in number to the value of the solution to the addition operation.

2. The system recited in claim 1, the operand object further comprising a moveable flap for hiding the solution to the operation indicated by the combination of the operand card and the operator card.

3. A system for illustrating a subtraction operation, comprising:

an operand object illustrating a numerical operand value, a plurality of numerical solutions to a mathematical operation performable on the operand, and group of marks equal in number to the value of the operand; and an operator object illustrating a numerical operator value, a subtraction symbol, and a group of apertures equal in number to the value of the operator, and having the shape of the marks of the operand object, and being formed in a portion of the operator object having a color of the marks of the operand object;

wherein the operand object and the operator object are cooperable such that when combined in a predetermined manner, a solution to a subtraction operation comprising the operand value and the operator value is indicated from among the plurality of solutions illustrated on the operand object, and the apertures of the operator object are aligned with marks of the operand object, such that remaining marks of the operand object are equal in number to the value of the solution to the subtraction operation if the solution is positive, and such that remaining apertures of the operator object are equal in number to the value of the solution to the subtraction operation if the solution is negative.

4. A system for illustrating a multiplication operation, comprising:

an operand object illustrating a numerical operand value, a plurality of numerical solutions to a multiplication operation performable on the operand, and a group of elongated apertures equal in number to the value of the operand;

an operator object illustrating a numerical operator value, a multiplication symbol, and a group of elongated apertures equal in number to the value of the operator, the elongated apertures of the operator object extending in a direction perpendicular to the elongated apertures of the operand object when the operator object is combined with the operand object, wherein the operand object and the operator object are cooperable such that when combined in a predetermined manner, a solution to a multiplication operation comprising the operand value and the operator value is indicated from among the plurality of solutions illustrated on the operand object, and wherein, when the operator object and the operand object are combined, the elongated apertures of the operand object and the elongated apertures of the operator object intersect to form a group of open spaces equal in number to the value of the solution to the multiplication operation.

5. The system recited in claim 4, the operand object further comprising a moveable flap for hiding the group of open spaces formed by the combination of the operand card and the operator card.

6. A system for illustrating a multiplication operation, comprising:

an operand object illustrating a numerical operand value, a plurality of numerical solutions to a multiplication operation performable on the operand, and a group of elongated stripes equal in number to the value of the operand;

an operator object illustrating a numerical operator value, a multiplication symbol, and a group of elongated apertures equal in number to the value of the operator, the elongated apertures of the operator object extending in a direction perpendicular to the elongated stripes of the operand object when the operator object is combined with the operand object, wherein the operand object and the operator object are cooperable such that when combined in a predetermined manner, a solution to a multiplication operation comprising the operand value and the operator value is indicated from among the plurality of solutions illustrated on the operand object, and wherein, when the operator object and the operand object are combined, the elongated stripes of the operand object and the elongated apertures of the operator object intersect to form a group of marks equal in number to the value of the solution to the multiplication operation.

7. The system recited in claim 6, the operand object further comprising a moveable flap for hiding the group of markings formed by the combination of the operand card and the operator card.

8. A system for illustrating a multiplication operation, comprising:

an operand object illustrating a numerical operand value, a plurality of numerical solutions to a mathematical operation performable on the operand, and a plurality of groups of marks, the number of marks in each group being equal to the value of the operand; and an operator object illustrating a numerical operator value, a multiplication symbol, and first apertures equal in number to the value of the operator;

the operand object and the operator object being cooperable such that when combined in a predetermined manner, a solution to a multiplication operation comprising the operand value and the operator value is indicated from among the plurality of solutions illustrated on the operand object, and wherein, when the operator object and the operand object are combined, the number of marks of the operand card revealed by second apertures of the operator card is equal to the value of the solution to the multiplication operation.

9. The system recited in claim 8, the operand object further comprising a moveable flap for hiding the group of second apertures of the operand card upon combination of the operand card and the operator card.

10. A system for illustrating a division operation, comprising:

an operand object illustrating a numerical operand value, a plurality of numerical solutions to a mathematical operation performable on the operand, and a group of marks equal in number to the value of the operand; and an operator object illustrating a numerical operator value, a division symbol, and a group of second apertures having a size corresponding to a number of marks of the operand object equal to the value of the operator;

wherein the operand object and the operator object are cooperable such that when combined in a predetermined manner, a solution to a division operation comprising the operand value and the operator value is indicated from among the plurality of solutions illustrated on the operand object, and wherein, when the operator object and the operand object are combined, a number of second apertures of the operator containing the number of marks to which the size of the second apertures corresponds is equal to the value of the solution to the division operation.

11. The system recited in claim 10, wherein, when the operator object and the operand object are combined, a number of marks of the operand object that partially fill an aperture of the operator object is equal to a remainder of the solution to the division operation.

12. The system recited in claim 10, the operand object further comprising a moveable flap for hiding the group of second apertures of the operand card upon combination of the operand card and the operator card.

* * * * *